US011555236B2

(12) United States Patent
McRae et al.

(10) Patent No.: US 11,555,236 B2
(45) Date of Patent: Jan. 17, 2023

(54) MECHANICALLY-ASSISTED GASEOUS ADDITION OF HYDROGEN TO METAL ALLOYS

(71) Applicant: ATOMIC ENERGY OF CANADA LIMITED / ÉNERGIE ATOMIQUE DU CANADA LIMITÉE, Chalk River (CA)

(72) Inventors: Glenn Aldon McRae, Ottawa (CA); Christopher Edward Coleman, Deep River (CA); Curtis John St. Louis, Kincardine (CA); Scott Thomas Langille, Ottawa (CA); James Leigh McLean Corrigall, Kingston (CA); Heidi Marie Nordin, Deep River (CA); Sean Michael Kevin Hanlon, Petawawa (CA); Scott Anthony Douglas Read, Petawawa (CA); Kevin William McCaugherty, Petawawa (CA)

(73) Assignee: Atomic Energy of Canada Limited / Énergie Atomique du Canada Limitée, Chalk River (CA)

(*) Notice: Subject to any disclaimer, the term of this patent is extended or adjusted under 35 U.S.C. 154(b) by 298 days.

(21) Appl. No.: 16/625,095

(22) PCT Filed: Jun. 21, 2018

(86) PCT No.: PCT/CA2018/050755
§ 371 (c)(1),
(2) Date: Dec. 20, 2019

(87) PCT Pub. No.: WO2018/232512
PCT Pub. Date: Dec. 27, 2018

(65) Prior Publication Data
US 2020/0208248 A1 Jul. 2, 2020

Related U.S. Application Data

(60) Provisional application No. 62/522,773, filed on Jun. 21, 2017.

(51) Int. Cl.
C23C 8/62 (2006.01)
C21D 9/08 (2006.01)
(Continued)

(52) U.S. Cl.
CPC ............. C23C 8/62 (2013.01); C21D 9/08 (2013.01); C21D 9/46 (2013.01); C22C 27/00 (2013.01); C23C 8/08 (2013.01); C23C 8/80 (2013.01)

(58) Field of Classification Search
None
See application file for complete search history.

(56) References Cited

U.S. PATENT DOCUMENTS 3,575,806 A 4/1971 Boulton
3,742,367 A 6/1973 Grossman
(Continued)

FOREIGN PATENT DOCUMENTS

CA 2804615 A1 1/2012
WO 2018/232512 A1 12/2018

OTHER PUBLICATIONS

Allegheny Technologies Incorporated (ATI), Reactor Grade Zirconium, 2014, https://www.atimaterials.com/Products/Documents/datasheets/zirconium/alloy/Zr_nuke_waste_disposal_v2.pdf (Year: 2014).*

(Continued)

Primary Examiner — Anthony J Zimmer
Assistant Examiner — Jacob J Gusewelle
(74) Attorney, Agent, or Firm — Bereskin & Parr LLP/S.E.N.C.R.L., s.r.l.

(57) ABSTRACT

An article formed of a metal alloy is covered at least partially with a metal hydride and a shell metal to form an
(Continued)

assembly. Load is applied to the assembly and the assembly is heated. The shell metal deforms around the article and the metal hydride and forms a gas proof seal. The metal hydride thermally decomposes to form hydrogen gas. At least a portion of the hydrogen gas dissociates and moves as monoatomic hydrogen into the article. The metal alloy can be a zirconium metal alloy, the metal hydride can be a zirconium metal hydride, and the shell metal can be substantially copper.

20 Claims, 9 Drawing Sheets

(51) Int. Cl.
    *C21D 9/46*    (2006.01)
    *C22C 27/00*   (2006.01)
    *C23C 8/08*    (2006.01)
    *C23C 8/80*    (2006.01)

(56) References Cited

U.S. PATENT DOCUMENTS

| | | | |
|---|---|---|---|
| 3,943,210 A | * | 3/1976 | Vetrano ............... C01B 6/02 376/901 |
| 2013/0111736 A1 | * | 5/2013 | Fruchart ............ C01B 3/0031 29/527.4 |
| 2016/0273090 A1 | | 9/2016 | He et al. |

OTHER PUBLICATIONS

International Search Report dated Aug. 28, 2018 in respect of PCT/CA2018/050755.
International Preliminary Report on Patentability dated Dec. 24, 2019 in respect of PCT/CA2018/050755.
Singh et al., "Hydrogen Charging, Hydrogen Content Analysis and Metallographic Examination of Hydride in Zirconium Alloys", BARC/2003/E/034, Bhabha Atomic Research Centre, Mumbai, 2003.
Choo et al., "Hydrogen Uptake and Corrosion Behaviour of Zr-2.5Nb Pressure Tubes in Wolsong Unit 1", Journal of Nuclear Materials, vol. 297, pp. 52-56, 2001.
Sayi et al., "Chemical Aspects of Hydrogen Ingress in Zirconium and Zircaloy Pressure Tubes: Ageing Management of Indian PHWR Coolant Channels—Determination of Hydrogen and Deuterium", BARC/2009/E/003, Bhabha Atomic Research Centre, Mumbai, 2009.
Murgatroyd et al., "Hydriding Zircaloy-2 in Lithium Hydroxide Solutions", Journal of Nuclear Materals, vol. 23, pp. 249-256, 1967.
Huang et al., "Hydriding of zirconium alloys in hydrogen gas", Materials Science and Engineering, vol. A161, pp. 247-253, 1993.
Urbanic, "Observations of Accelerated Hydriding in Zirconium Alloys", Zirconium in the Nuclear Industry: Sixth International Symposium, ASTM STP 824, American Society of Testing and Materials, 1984, pp. 554-571.
Goldman et al., "Hydrogen Pickup During Corosion Testing of Zirconium and Zircaloy-2", Westinghouse Electric Corporation, Pittsburgh, 1953.
Kass et al., "Corrosion and Hydrogen Absorption Properties of Nickel-Free Zircaloy-2 and Zircaloy-4", Transactions of the American Nuclear Society, vol. 55, pp. 77-100, 1962.
Hillner, "Hydrogen Absorption in Zircaloy During Aqueous Corrosion, Effect of Environment," Westinghouse Electric Corporation, Pittsburgh, 1964.
Coleman et al., "Susceptability of Zirconium Alloys to Delayed Hydrogen Cracking", Zirconium in the Nuclear Industry, ASTM STP 633, American Society of Testing and Materials, 1977, pp. 589-607.
Marchi, "Technical Reference on Hydrogen Compatibility of Materials—Copper Alloys: Pure Copper (code 4001)" Sandia National Labs, Livermore, 2006.
Agilent Technologies, "Chapter 14 Material Expansion Coefficients—Linear Thermal Expansion Coefficients of Metals and Alloys", Laser and Optics User's Manual vol. I, Agilent Technologies, 2007, pp. 279-290.
Goldak et al., "Lattice Parameters, Thermal Expansions, and Gruneisen Coefficients of Zirconium 4.2 to 1130 K", Physical Review, vol. 144, No. 2, pp. 478-484, 1966.
Cheadle et al., "Operating Performance of CANDU Pressure Tubes", Atomic Energy of Canada Limited, Chalk River, 1989.
International Atomic Energy Agency, "Assessment and management of ageing of major nuclear power plan components important to safety: CANDU pressure tubes", IAEA, Austria, 1998.
McLellan, "Solid Solutions of Hydrogen in Gold, Silver, and Copper", Journal of Physical Chemical Solids, vol. 34, pp. 1137-1141, 1973.
Callen, "Thermodynamics and an Introduction to Thermostatistics", John Wiley & Sons, New York, 1985, pp. 181-202.
Fick, "Ueber Diffusion", Annalen der Physik, vol. 170, No. 1, pp. 59-86, 1855.
McRae et al., "The First Step in Delayed Hydride Cracking in Zirconium Alloys", Journal of Nuclear Materials, pp. 130-143, 2010.
European Extended Search Report dated Jun. 28, 2021 in respect of European Application No. 18819886.5.

* cited by examiner

MECHANICALLY-ASSISTED GASEOUS ADDITION OF HYDROGEN TO METAL ALLOYS

CROSS-REFERENCE TO RELATED APPLICATIONS

This is a national stage application of International Application No. PCT/CA2018/050755 filed on Jun. 21, 2018, which claims priority to U.S. Provisional Application No. 62/522,773 filed on Jun. 21, 2017, and the entire contents of each are hereby incorporated herein by reference.

FIELD

The present disclosure relates to materials science and nuclear technology. The present disclosure more particularly relates to apparatuses for and methods of adding hydrogen to metal alloys.

INTRODUCTION

The following paragraphs are not an admission that anything discussed in them is prior art or part of the knowledge of persons skilled in the art.

Fracture toughness of zirconium components can change because of hydrogen ingress, and neutron irradiation. Ingress of hydrogen isotopes can lead to Delayed Hydride Cracking (DHC) if hydrogen concentrations exceed critical levels at flaws under tension. DHC has been responsible for a number of failures of zirconium components in chemical plants, fuel sheaths in Pressurized Water Reactors (PWRs) reactors, and pressure tubes in CANDU and RBMK reactors. Support for continuing safe operations makes it desirable for testing at expected end-of-life hydrogen concentrations. In addition, for nuclear applications, it is preferable for testing to be performed under representative irradiation damage conditions. Thus, methods are being developed to add hydrogen to ex-service pressure tubes in a manner that does not eliminate irradiation damage. Fitness for Service Guidelines (FFSG) for CANDU reactors require no hydrides to be present in the body of Zr-2.5Nb pressure tubes during operation, which corresponds to hydrogen concentrations less than 60 ppm (by weight of equivalent protium) at the inlet and 80 ppm at the outlet. Initial hydrogen concentrations of up to 25 ppm in as-received pressure tubes currently in service limits the end-of-life hydrogen ingress to less than 70 ppm. Ingress in the body of the tube can be mainly the result of corrosion between the zirconium alloy and the heavy water coolant, with a fraction of the released deuterium absorbed at 1 ppm per year, which is equivalent to 2 ppm by weight of deuterium per year. Higher hydrogen concentrations can be tolerated at the inlet and outlet compressive regions of the pressure tube rolled joint. In this region, hydrogen concentrations can be higher because of ingress through the stainless-steel end fitting. Hydrogen can diffuse from the compressive regions of the rolled joint to the body of the tube, which experiences a hoop stress exerted by pressure of the coolant (e.g., 10 MPa). This transition region can be characterized by the burnish mark associated with the rolling of the zirconium pressure tube into the stainless-steel end fitting. Currently, CANDU reactors are being considered for operation beyond the original design life. Operating CANDU reactors in Ontario into the late 2020s would double their design life, and a corresponding increase in hydrogen concentrations would be expected. For an operating life of 50 years, utilities need to demonstrate continued safe operations with hydrogen concentrations in Zr-2.5Nb pressure tubes up to 150 ppm. Pressure tubes can be operated safely with hydrides present if it can be demonstrated that they still conform to CSA N285.8. Burst tests of pressure tubes removed from reactor can be performed to ensure continued safe operation. These tests require addition of hydrogen to end-of-life concentrations while maintaining the changes to the mechanical properties because of irradiation while in-service, which can introduce defect clusters in the metal, increase yield strength, and lower fracture toughness.

Known techniques of adding hydrogen to zirconium are electrolytic hydriding, and gaseous hydrogen addition. A third technique, aqueous lithium hydroxide corrosion, has been used to increase the hydrogen concentration in Zircaloy-2 pressure tubes. This technique operates at temperatures and pressures comparable with those in CANDU reactors, except with much higher lithium hydroxide concentrations. Although the process can be relatively inexpensive, it can be complicated by lithium ingress changing oxide chemistry at the surface, uneven hydrogen uptake, and uncertainties in final hydrogen concentration. In addition, the corrosion process can introduce activity into the lithium hydroxide solution, which can be problematic should the pressure boundary be lost during the hydriding process.

Electrolytic hydriding involves an electrochemical cell in which the zirconium is the cathode, and the anode is typically made of lead. A direct current is used to deposit a zirconium hydride layer on the zirconium sample. Then, the sample is heated to allow the hydrogen to diffuse from the surface hydride to the bulk of the metal. The remaining hydride layer is removed from the surface of the sample. The rates of electrolytic hydriding can be predictable, and the process can be simple and inexpensive for small samples, however, the current required to add hydride to large objects necessitates cooling of the electrolyte to avoid evaporation. In addition, uneven oxide layers on the sample may result in uneven hydrogen uptake. Forming a deuteride layer can be expensive because of the requirement for deuterated sulfuric acid in addition to heavy water. The main objection to using electrolytic hydriding to add hydrogen to pressure tubes is the large volume of electrolyte, which includes corrosive sulfuric acid that would have to be contained within a hot cell. The time required to deposit the hydride layer can be a week, and at 350° C., a further 12 hours heat treatment would be required for hydrogen diffusing from the hydride layer to reach 98% of the final equilibrium hydrogen concentration throughout a 4 mm pressure tube.

Gaseous hydrogen addition takes advantage of the equilibrium that can be established between hydrogen as a gas and atomic hydrogen in solid solution in zirconium. Hydrogen gas at a known pressure P, or a known amount of hydrogen in a calibrated volume from which the pressure can be determined with the gas law, is at equilibrium with hydrogen in solid solution at concentration, $C_H$, according to Sievert's Law ($C_H=K\sqrt{P}$; where K is Sievert's constant, which is dependent on the metal and the temperature). By changing the partial pressure and temperature, different hydrogen concentrations can be obtained in the metal. Practice of this technique can require a sensitive pressure gauge calibrated for hydrogen if hydrogen gas is used directly, and a well calibrated volume. The advantages of gaseous hydriding can include: capability to hydride using any combination of protium, and deuterium; and, unlike electrolytic hydriding, gaseous hydrogen addition can be a dry process. The disadvantages can include: large volumes of high-temperature high-pressure hydrogen gas, about 7

MPa, can be required for large components such as pressure tubes, which poses a potential explosion and fire hazard in a hot cell; and the hydrogen-addition apparatus needs to be leak tight to confirm equilibrium has been reached.

A variant of gaseous hydrogen addition is done at atmospheric pressures and uses Coulometric titration by difference to determine the amount of hydrogen added (as disclosed in United States Publication No. 2016/0273090 A1 to He et al). The advantages of this technique are that it can be done at atmospheric pressure and that the hydrogen concentration can be inferred during the procedure. The disadvantages are that the process may require specialized equipment that can require constant adjustments and calibration with standards, and the reproducibility of addition may be only 17%.

SUMMARY

The following is intended to introduce the reader to the detailed description that follows and not to define or limit the claimed subject matter.

In an aspect of the present disclosure, a method of adding hydrogen to a metal alloy is disclosed. The method can include: providing an article formed of the metal alloy; providing a metal hydride; covering at least a portion of the article and the metal hydride with a shell metal to form an assembly; applying load to the assembly; and heating the assembly. The shell metal can deform around the portion of the article and the metal hydride and can form a gas proof seal. The metal hydride can thermally decompose to form hydrogen gas. At least a portion of the hydrogen gas can dissociate and can move as monoatomic hydrogen into the article.

The article can be in the form of a sheet, and the step of covering can include arranging the article and the metal hydride between two plates of the shell metal. The article can be in the form of a tube, and the step of covering can include inserting the metal hydride and a plug of the shell metal in the tube. The metal hydride can be in the form of a powder, and the method can include dispersing the powder onto a surface of the article.

In the step of applying, the load can be below a yield strength of the metal alloy and can be greater than a yield strength of the shell metal. In the step of applying, the load can apply a pressure that is maintained between about 10 MPa and 320 MPa. In the step of heating, the temperature can be maintained between about 20° C. and 500° C., or between about 200° C. and 350° C. The method can include maintaining the assembly in generally isothermal and isobaric conditions between about 3 h and 7 days.

The method can include selecting an amount of the powder based on a desired amount of the hydrogen to be added to the article. The method can include calculating the amount of the powder based on at least one of a mass balance and an empirical relation determined by experiment.

The metal alloy can be a zirconium alloy, and the zirconium alloy can be Zr-2.5Nb or Zircaloy-2. The metal hydride can be a zirconium hydride, and the zirconium hydride can be $ZrH2$. Internal surfaces of the shell metal can include a barrier oxide layer that fails and permits hydrogen ingress. External surfaces of the shell metal can include an oxide layer that is a barrier to hydrogen egress. The shell metal can be substantially copper.

An article can be manufactured in accordance with the methods disclosed herein. After the steps of adding hydrogen, the article can have a hydrogen concentration of at least 100 ppm. Prior to the steps of adding hydrogen, the article can be irradiated in a nuclear reactor.

In an aspect of the present disclosure, an assembly for adding hydrogen to a metal alloy is disclosed. The assembly can include: an article formed of the metal alloy; a powder formed of a metal hydride; and a shell metal covering at least a portion of the article and the powder. The shell metal can form a gas proof seal around the portion of the article and the powder.

The article can be in the form of a sheet, the shell metal can be in the form of two plates, and the sheet can be arranged between the two plates. The article can be in the form of a tube, the shell metal can be in the form of a plug, and the powder and the plug can be inserted into the tube. The powder can be dispersed onto a surface of the article.

The metal alloy can be a zirconium alloy, and the zirconium alloy can be Zr-2.5Nb or Zircaloy-2. The metal hydride can be a zirconium hydride, and the zirconium hydride can be $ZrH2$. Internal surfaces of the shell metal can exclude a barrier oxide layer so that hydrogen ingress is permitted. External surfaces of the shell metal can include an oxide layer that is a barrier to hydrogen egress. The shell metal can be substantially copper.

The assemblies disclosed herein can be combined with a load frame for applying load to the assembly to apply a pressure between about 10 MPa and 320 MPa. The assemblies disclosed herein can be combined with an oven for heating the assembly to a temperature between about 20° C. and 500° C., or between about 200° C. and 350° C.

In an aspect of the present disclosure, a method of adding hydrogen to a zirconium metal alloy is disclosed. The method can include: providing an article formed of the zirconium metal alloy; providing a powder formed of a zirconium metal hydride; enveloping the article and the powder with a shell metal to form an assembly, wherein the shell metal is substantially copper; applying load to the assembly to apply a pressure that is maintained between about 10 MPa and 320 MPa; and heating the assembly to a temperature that is maintained between about 200° C. and 350° C. The shell metal can deform around the article and the powder and can form a gas proof seal. The powder can thermally decompose to form hydrogen gas. At least a portion of the hydrogen gas can dissociate and can move as monoatomic hydrogen into the article.

In an aspect of the present disclosure, a method can include: providing a metal alloy; providing a hydrogen-containing compound; contacting the metal alloy with the hydrogen-containing compound; applying load to the metal alloy and the hydrogen-containing compound; and heating the metal alloy and the hydrogen-containing compound. The hydrogen-containing compound can thermally decompose to form hydrogen gas. At least a portion of the hydrogen gas can dissociate and can move as monoatomic hydrogen into the metal alloy.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Figure 1:
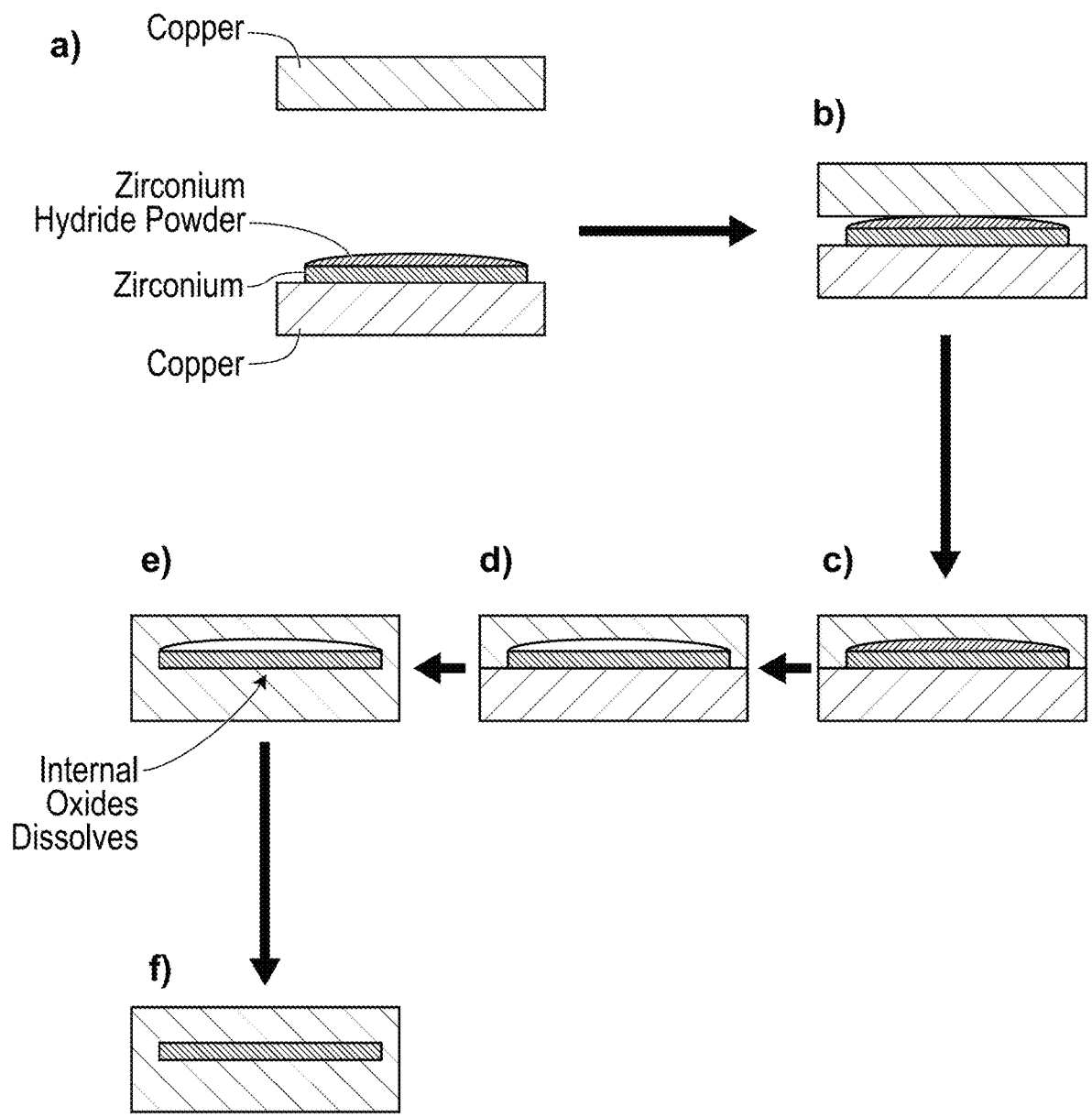
FIG. 1 shows a graphical representation of mechanical hydrogen ingress using a copper shell.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

A 'mechanically-assisted' gaseous technique is disclosed herein for quantitative homogeneous addition of hydrogen to ex-service Zr-2.5Nb pressure tubes removed from reactors to projected end-of-life concentrations for times and temperatures that maintain sufficient irradiation damage for subsequent burst testing. The concentration of hydrogen that can be added with current techniques is generally thought to be limited by the Terminal Solid Solubility Dissolution (TSSD) concentration, which occurs at the temperature, called the TSSD temperature, defined by the maximum slope of the endothermic heat flow curve during Differential Scanning calorimetry (DSC). For Zr-2.5Nb, concentrations of approximately 100 ppm correspond to TSSD temperatures of 350° C. At this temperature, irradiation damage from service is removed at 6.6%/day, which was determined from measurements of changes in yield strength of irradiated pressure tube material with time. Thus, hydrogen addition at 350° C. should take less than a week to preserve at least 50% of the irradiation damage. TSSD temperatures of 385° C. correspond to end-of-life concentrations, ~150 ppm; at these temperatures irradiation damage is removed in hours. Thus, hydrogen addition techniques that rely on TSSD cannot be used to add hydrogen to end-of-life concentrations without significant loss in irradiation damage. At temperatures below 300° C., irradiation damage can be removed at less than 1%/week, and at 200° C. irradiation damage can be stable for practical purposes.

Alternatively, techniques that exceed TSSD can be adopted. Adding hydrogen above the TSSD concentration limit requires supersaturation or hydride formation. Hydrogen concentrations beyond TSSD limits have been reported for hydrogen overpressures of up to 17 MPa. The mechanically-assisted technique uses external pressures that are much higher than pressures used in typical gaseous addition to drive hydrogen to concentrations beyond the solubility limit allowing significantly higher hydrogen concentrations to be achieved. The precision of mechanically-assisted hydrogen addition can be high because it depends on a mass measurement made with a standard analytical balance, instead of a pressure, volume or Coulometric-difference measurement. The precision of the technique has been demonstrated by adding hydrogen to Zircaloy-2 (Zr-2) fuel sheath. The Zr-2 is used instead of Zr-2.5Nb for demonstration because it does not contain metastable beta-phase that decomposes with time at temperature and changes the concentration of hydrogen in the alpha-phase. It will be appreciated that the same technique can work with zirconium alloys in general.

FIG. 1 shows a step-by-step graphical representation of mechanical hydrogen ingress in a copper shell. In step a) the zirconium article in the form of a sheet is placed on top of a copper plate, and hydride powder (e.g., $ZrH_2$) is spread over the zirconium. A second copper plate is placed over top of the zirconium hydride to cover and envelop the zirconium sheet and zirconium hydride powder in an assembly. In step b) a small load is applied to the copper shell, and zirconium. At this point the oven is set to the desired temperature. The load is increased to a value between the yield stress of the shell material, and the zirconium. As the load and temperature increase the shell will deform around the zirconium, forming the seal seen in c). In the example depicted in FIG. 1, the shell deforms around the zirconium, but a seal can also be made just on the surface of the zirconium with similar effectiveness. For the examples described herein, the zirconium hydride powder thermally decomposes at the desired temperature into hydrogen gas and zirconium metal powder, or hydrogen gas and zirconium hydride powder with lower stoichiometry. The hydrogen forms the gas pocket seen in d). The internal barrier oxides fail, as shown in e), exposing the metal to the hydrogen gas pocket. Finally, in 0 the hydrogen gas pocket collapses as the load pushes the hydrogen into the zirconium and copper.

Copper makes a good shell metal because of a favourable combination of yield strength, hydrogen permeability, hydrogen solubility, melting temperature, formation of oxide on external surfaces, and cost when compared with other potential shell metals such as steel, nickel, gold, and aluminium.

Two techniques for mechanically-assisted gaseous-hydrogen addition were developed. The first technique demonstrates quantitative homogeneous addition of hydrogen into flat sheets of Zircaloy-2. Quantitative hydrogen addition tests were performed using an MTS-810 500 kN load frame. A clamshell oven and thermal control unit were built and certified to heat samples in situ at temperatures between room temperature and 500° C. Zircaloy-2 fuel sheath material (with as received hydrogen concentration 14 ppm) in the form of squares (Zr-2, 25 mm×25 mm×0.9 mm) or circles (1 cm diameter×0.9 mm thick), and zirconium hydride powder ($ZrH_2$ Sigma Aldrich), were placed between copper sheets. Two types of copper were used for the sheets: C110 or C101. The copper sheets were typically 28.6 mm×28.6 mm×3.2 mm for the square sheets, and 1 cm diameter and 0.9 mm thick for the circular Zr-2 material. The copper and zirconium metal surfaces were made shiny with Scotch-Brite pads and their masses determined, along with the masses of the calculated amount of zirconium hydride powder, using an Acculab ALC-210.4 balance with a precision of ±0.0001 g. The Cu—(ZrH$_2$)—(Zr-2)-Cu sandwich assemblies were situated between steel platens (M42, hardened to Rockwell C 60) fitted to the load frame. Compressive loads corresponding to pressures between 60 MPa and 320 MPa were used. These loads were selected to be greater than the yield strength of the copper, and below the yield strength of Zircaloy-2 at the test temperature. The clamshell oven was closed around the platens and set to the test temperature. The temperature was controlled by a thermocouple attached to the assembly. Upon completion the assembly was removed from the load frame and quenched in room temperature water.

The second procedure for mechanically-assisted gaseous-hydrogen addition was devised to add hydrogen into a tube-shaped article in the form of a Zr-2.5Nb micro pressure tube that was fabricated from an octagon ingot beta-quenched from 1015° C. The octagon ingot was 35 cm long and 5 cm in diameter. Approximately 13 cm was extruded at 815° C. with an extrusion ratio of 10:1. Extrusion conditions were maintained close to constant for each micro tube so that microstructural variations would be minimized. The tube chemical composition was: 2.5 wt % Nb, 2940 wt.ppm Fe, 37 wt.ppm C, 10 wt. % Si, 460 wt.ppm Cr, balance Zr.

Figure 2:
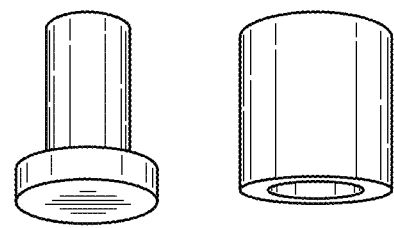
FIG. 2 shows a pressure tube and a copper plug before assembly.

The pressure tube used was a smaller version of the CANDU pressure tube: the micro pressure tube had an internal diameter (ID) of 8.7 mm and an outer diameter (OD) of 13.7 mm, while pressure tubes used in CANDU reactors have an ID of 103.4 mm and a wall thickness of 4.6 mm. The challenge was to apply a constant, uniform normal force at the curved surface of the tube. The solution was to machine a flanged copper plug (grade C110), with the flange the same outer diameter as the micro pressure tube and a long cylindrical section with the same internal volume as the micro pressure tube, but with an external diameter 0.060" smaller than the internal diameter of the micro pressure tube. The plug and pressure tube are shown in FIG. 2. The copper plug used for this test was machined with a flange at one end to aid assembly, and prevent the loss of any zirconium hydride powder when the test assembly was placed in the hydraulic press.

A measured mass of zirconium hydride was spread on a fine copper mesh to distribute the powder evenly before being wrapped around the copper plug. The copper plug, with mesh and zirconium hydride, was then inserted into the micro pressure tube. The assembly was inserted into a hydraulic hand jack and the copper plug pressed (with approximately 175 kN) until it was flush with the top of the micro pressure tube. The assembled test was then placed in an oven at 350° C. for one week before being removed and quenched in room temperature water. The copper plug was machined out of the micro pressure tube.

The hydrogen concentrations in the zirconium alloys were determined with Differential Scanning calorimetry (DSC) using two instruments. Specimens were cut from the centre of the Zr-2 sample using a slow speed diamond saw and analysed for hydrogen dissolution temperatures using a TI Q20 Power Compensation DSC. Samples of Zr-2 were punched and annealed at 500° C. for two hours before being analysed for hydrogen dissolution temperatures using a Netzsch Pegasus 404C Heat Flux DSC with a 6.235.4-63.9.00+S measurement head. The micro pressure tube was sectioned and analyzed using a TI Q20 Power Compensation DSC. In all cases, the DSC maximum-slope temperatures were determined from the average of the second and third measurements of the point of maximum change of endothermic heat flow with temperature. These temperatures were converted to hydrogen concentrations using calibration curves determined with hot vacuum extraction mass spectroscopy for Zircaloy-2 and Zr-2.5Nb that included thermal lag corrections for the scan rate of 10° C./min.

In the mechanically-assisted technique to add hydrogen to zirconium, the source of hydrogen can be zirconium hydride powder, which thermally decomposes forming hydrogen gas at the temperatures and pressures used in these examples. Under the anoxic reducing conditions between the copper and zirconium, the barrier oxides on the internal metal surfaces are not regenerated when they are lost at the bottom of cracks and pores because of oxygen diffusion into the metal. When the barrier oxides fail, hydrogen ingress can occur into both the copper and the zirconium.

When the oxides fail, hydrogen partitions as atomic hydrogen in copper and zirconium, and hydrogen gas in the compressed region between the copper and zirconium; the gas will be at the pressure corresponding to the load. At equilibrium, the concentration of atomic hydrogen in the copper is given by Sievert's Law for the pressure and temperature. Hydrogen goes into interstitial sites in the zirconium matrix if the concentration there is less than a limiting value, $C_-$, which can be determined empirically from experiments and is approximately given by:

$$C_- = C_{TSS}\exp\left[\frac{-1.8\,\sigma V}{RT}\right] \quad (1)$$

for temperatures greater than 200° C. and less than 350° C., where σ is the yield strength of zirconium and V the partial molar volume of hydrogen in zirconium. The concentration $C_{TSS}$ is the terminal solid solubility (TSS) for hydrogen at the temperature. The TSS temperature is given by the first indication of exothermic heat flow on cooling the zirconium metal, which contains hydrogen at the TSS concentration, from a temperature where all the hydrogen is in solution. If $C_-$ is reached in the zirconium during the hydrogen addition process, any further hydrogen addition will cause hydrides to precipitate in the zirconium. Similar equations and techniques can be used to determine $C_-$ for temperatures above 350° C. and below 200° C.

The mechanically-assisted hydrogen-addition technique can be supported by mass balance, which can be used to determine the amount of added hydrogen. The mass-balance equation that is presented herein relies generally on three conditions being present: hydrogen is found in the copper at the Sievert's concentration; the initial hydrogen concentration in copper is negligible; and, the metal hydride, in this example, ZrH$_2$, dissociates into hydrogen gas that is available to enter the metals when the protective oxides fail. The initial total mass of hydrogen before pressure and temperature are applied is given by:

$$m_{H,i} = m_{Zr}C_0 + F_H m_{Zr\text{-}H_2} \quad (2)$$

where $C_0$ is the initial concentration of hydrogen in zirconium; $m_{Zr}$ is the mass of zirconium; $m_{ZrH_2}$ is the mass of zirconium hydride powder; and $F_H$ is the mass fraction of hydrogen (protium) in zirconium hydride: 0.02162.

After temperature and pressure are applied and the internal metal oxides fail, hydrogen is partitioned into the components of the assembly. The amount of hydrogen that partitions to the zirconium alloy is calculated with mass-balance equations. There are two cases depending on whether the desired hydrogen concentration is above or below $C_-$. When the desired concentration of hydrogen in the zirconium alloy is below the $C_-$ value, the hydrogen partitions to the zirconium alloy, the remaining zirconium metal after the complete decomposition of the hydride, and the copper in accordance with:

$$m_{H,f} = C_{Zr}(F_{Zr}m_{ZrH_2} + m_{Zr}) + m_{Cu}S_{Cu} \quad (3)$$

where $F_{Zr}$ is the mass fraction of zirconium in zirconium hydride, equal to $1-F_H$. The mass of copper is $m_{Cu}$. $S_{Cu}$ is the solubility of hydrogen in copper given by Sieverts' Law:

$$S_{Cu} = S_o \exp\left[\frac{E_s}{RT}\right] P^{1/2} \quad (4)$$

where the value of $S_o$ is 720±80 [mol $H_2 m^{-3} MPa^{-1/2}$] and $E_s$ is 42.0±0.6 [kJ/mol]; T is the temperature in Kelvin; R is the ideal gas constant 8.314 [J/mol K]; and P is the fugacity of the hydrogen gas. The fugacity is calculated from the force exerted by the load frame divided by the area of the copper above the zirconium sample, which gives a pressure, and hydrogen fugacity constants that relate pressure to gas fugacity. The applied loads were greater than the yield strength of the copper but less than the yield strength of the zirconium. Thus, the copper deformed onto or around the zirconium sample upon loading making a seal, and the fugacity of the hydrogen gas formed by the decomposition of the zirconium hydride was derived from the pressure on the copper.

Equating Equations 2, and 3, and solving for $C_{Zr}$ yields the equation used to predict hydrogen concentrations below $C_-$ in the zirconium alloy:

$$C_{Zr} = \frac{F_H m_{ZrH_2} + m_{Zr}C_0 - m_{Cu}S_{Cu}}{m_{Zr} + F_{Zr}m_{ZrH_2}} \quad (5)$$

When the desired hydrogen concentrations are above the $C_-$ values, the hydrogen partitions to the zirconium alloy, and the copper, but now not all the zirconium hydride powder decomposes. In this case, mass balance provides $$C_{Zr} = \frac{F_H m_{ZrH_2} + m_{Zr}C_0 - m_{Cu}S_{Cu} - m_{H\ in\ ZrH_x}}{m_{Zr}} \quad (6)$$

Where $m_{H\ in\ ZrH_x}$ is the mass of hydrogen in the residual zirconium hydride powder remaining after applying the method described herein. The stoichiometry x in $ZrH_x$ depends on temperature with values that are approximately given by $$x = \exp\left[\frac{1.8\sigma V}{RT}\right] \quad (7)$$

for temperatures greater than 200° C. and less than 350° C. When high precision and accuracy are required, the stoichiometry and the mass of residual zirconium hydride powder remaining is determined empirically from a series of additional measurements at the desired temperature. Similar equations and techniques can be used to determine x for temperatures above 350° C. and below 200° C.

The second technique demonstrates hydrogen addition to a micro pressure tube. The gas fugacity in Equation 4 was that applied by the copper plug to the inside diameter of the micro pressure tube, resulting from the difference in the thermal expansion of the copper and zirconium. Copper has a higher coefficient of thermal expansion than zirconium and will exert a force on the zirconium micro pressure tube when the assembly is heated. The pressure of the hydrogen gas was calculated from the strain and Young's Modulus for copper and the assumption that the zirconium micro pressure tube did not deform. The stress applied to the zirconium micro pressure tube, and in turn the hydrogen gas pressure, was approximated using:

$$\sigma = \frac{D_{Cu} - D_{Zr}}{D_{Zr}} E_{Cu} \quad (8)$$

where $D_{Cu}$ and $D_{Zr}$ are the unconstrained outside and inside diameters, respectively, for the copper plug and the zirconium micro pressure tube at the test temperature. $E_{Cu}$ is Young's Modulus for copper at the test temperature.

Figure 3:
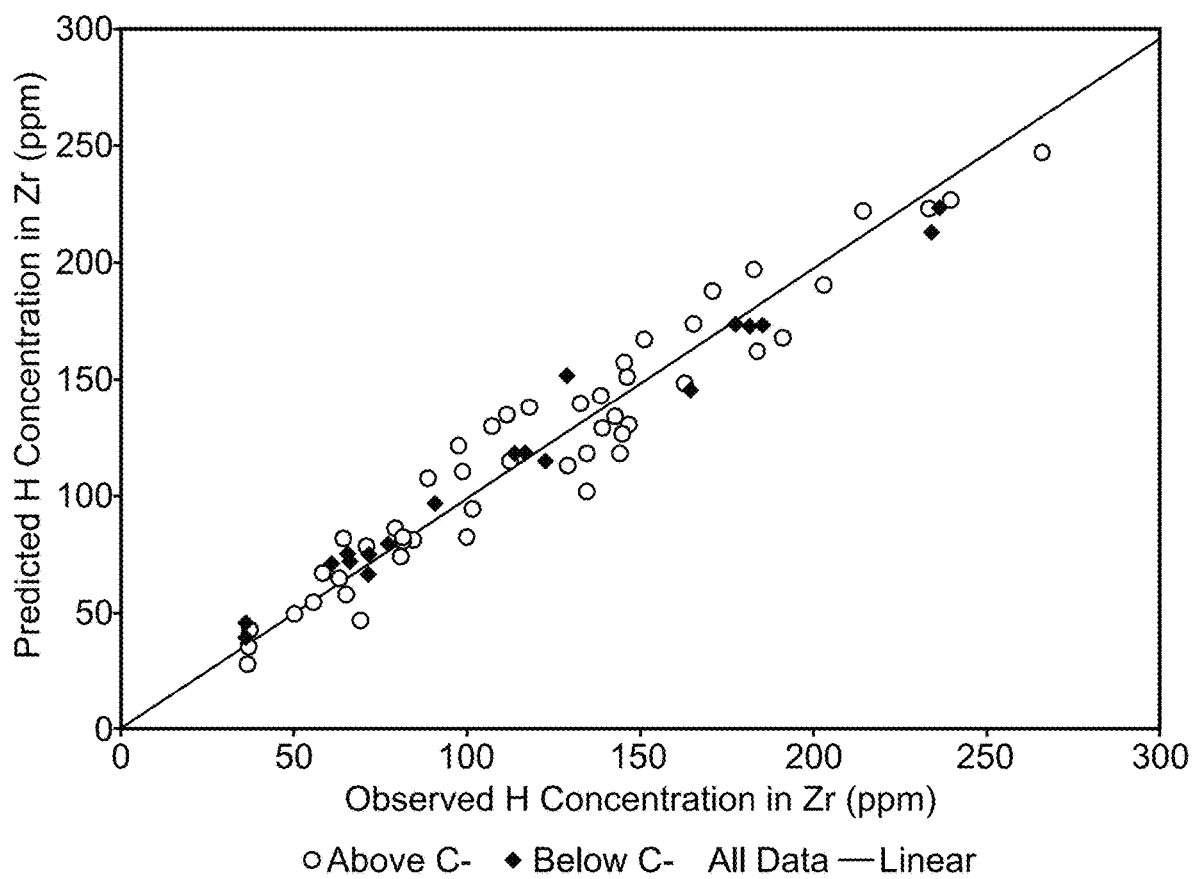
FIG. 3 is a graph showing observed hydrogen concentrations and predicted hydrogen concentrations.

FIG. 3 shows that hydrogen can be added in quantitative measures to flat sheets of Zr-2 fuel sheath surrounded by copper. The observed hydrogen concentrations matched those predicted by the mass-balance equations. The predicted values were made with pressures between 60 MPa, and 320 MPa, oven temperatures between 200° C. and 425° C., zirconium hydride masses between 1 mg and 120 mg, copper masses between 2 g and 200 g, and zirconium masses between 0.4 g and 4 g. These various initial conditions all resulted in predictions with Equations 5 and 6 that were validated by the observations as shown in FIG. 3. See also Tables 1, 2 and 3 below.

The accuracy and precision of the mechanically-assisted hydrogen-addition technique is demonstrated by the linear relation in FIG. 3. The equation for the line in FIG. 3 is:

$$C_{measured} = (0.99 \pm 0.03) C_{Predicted} \quad (9)$$

where the uncertainty is a 1-sigma value.

The slope of the line is unity within the 95% confidence interval. The line can thus be considered a one-to-one plot showing that the mechanically-assisted gaseous-hydrogen addition technique can be used to add hydrogen to zirconium with 99% accuracy and 3% precision.

The uncertainty of the measurement is comparable to that of hot vacuum extraction mass spectrometry (HVEMS), against which the DSC method used is ultimately calibrated. The predictions rely on the relationship for hydrogen solubility in copper; improving this relationship will improve the accuracy, and precision of the predictions.

The homogeneity of the hydrogen was determined with DSC using specimens cut from the side, and the centre of a sample. The maximum-slope endothermic dissolution temperatures were 404° C.±4° C. for the side-cut specimen and 405° C.±4° C. for the centre-cut specimen; these temperatures correspond to 168 ppm. These measurements support the conclusion that hydrogen was dispersed homogenously throughout the sample. Good homogeneity is also inferred from the agreement of the predicted and measured dissolution temperatures.

Figure 4:
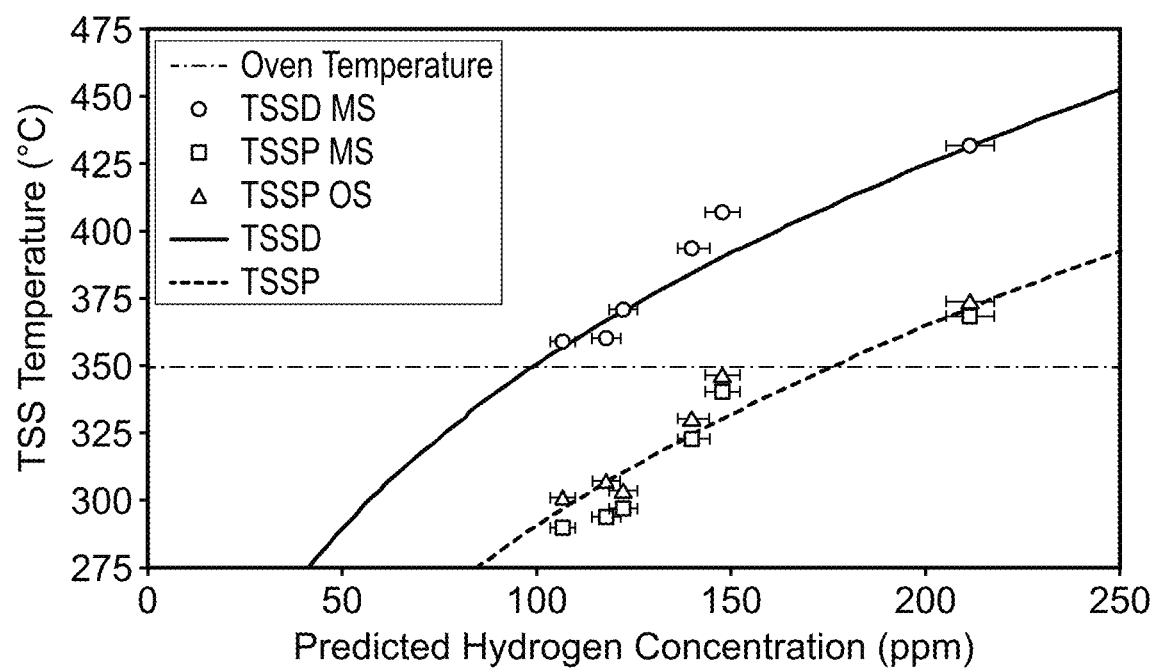
FIG. 4 is a graph showing temperatures and predicted hydrogen concentrations in a zirconium alloy measured with Differential Scanning calorimetry (MS: maximum slope; OS: onset temperature, for TSSD and TSSP: terminal solid solubility for dissolution and precipitation, respectively)

FIG. 4 shows results for hydrogen addition tests conducted with oven temperatures of 350° C. Temperatures of DSC heat flow features associated with the predicted concentrations are shown for endothermic (TSSP) and exothermic (TSSD) conditions. MS is the maximum-slope temperature and OS is the onset temperature. The maximum concentration of hydrogen in solution calculated with the TSSD maximum-slope equation for Zircaloy-2 is 100 ppm, which is represented by the intersection of the TSSD curve and the horizontal line at 350° C. If TSSP were the limit, then the maximum concentration would be 175 ppm. Values as high as 212 ppm were observed with test times of 4 days. The data in FIG. 4 show that hydrogen can be added quantitatively to concentrations above the limits inferred from TSSD and TSSP.

The concept of adding hydrogen beyond TSS enables the addition of relatively large amounts of hydrogen at relatively low temperatures and short times. For instance, a mechanically-assisted addition of hydrogen to a concentration of over 200 ppm has been demonstrated at 280° C. in 20 hours; see Table 2 below. In another test, a mechanically-assisted addition of hydrogen to a concentration of 100 ppm has been demonstrated at 200° C. in 22 hours, see Table 1. For these temperatures and times, no significant irradiation damage is lost. The mechanically-assisted hydrogen technique can be repeated by replenishing the zirconium hydride powder; thus, higher concentrations can be achieved.

In practice, to add hydrogen to irradiated material removed from a reactor, a preliminary test can be carried out on an article of similar geometry to the irradiated article. Once the conditions for hydrogen addition are known for a specific geometry, the desired concentrations can be reproduced. However, for many applications, it can be less important to know a priori how much hydrogen is being added, and more important that the value be high, achieved in a short period of time and at a low temperature.

Figure 5:
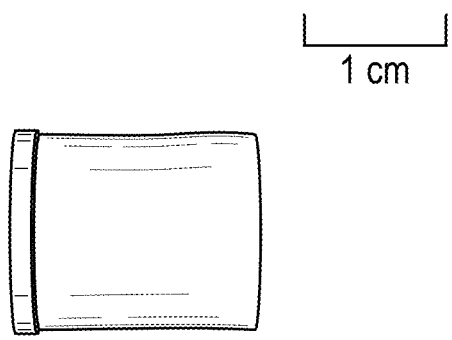
FIGS. 5 and 6 show the pressure tube and the copper plug as a test assembly after removal from an oven.
Figure 6:
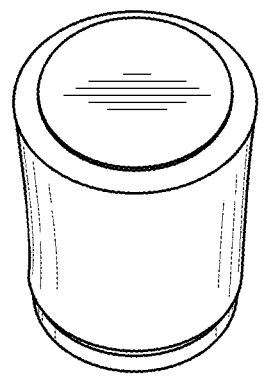
Figure 7:
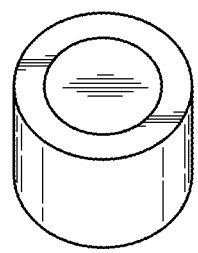
FIG. 7 shows the pressure tube and the copper plug after removing a flange and deformed end.
Figure 8:
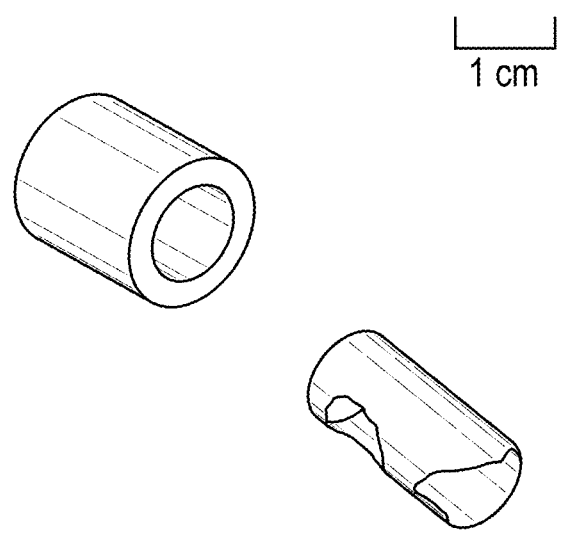
FIG. 8 shows the pressure tube with remnants of the copper plug after boring.

Referring now to FIGS. 5 and 6, a black oxide formed over the surface of the micro pressure tube while in the oven, but otherwise the assembly was unchanged. The flange and deformed end of the copper plug, shown in FIG. 2 before assembly, were removed using a lathe; the result is shown in FIG. 7. An attempt to remove the copper plug with a 5-tonne press proved unsuccessful, suggesting there was a strong metal-to-metal contact between the copper plug and the micro pressure tube. The copper plug was removed from the micro pressure tube using a lathe and a boring bar. FIG. 8 shows the micro pressure tube with the copper plug removed. FIG. 8 also shows the copper plug when it finally released after boring.

Figure 9:
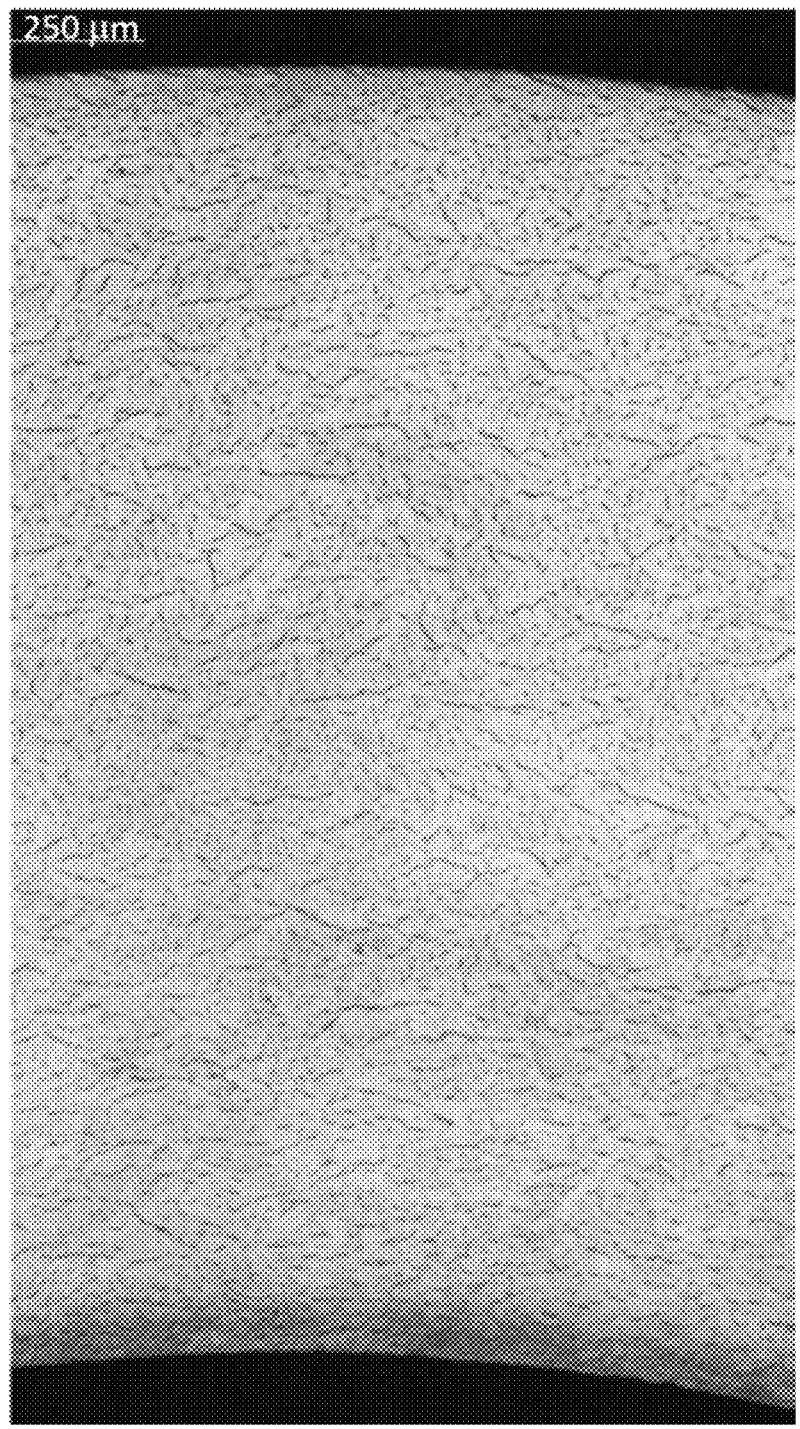
FIG. 9 is a light metallographic image of a room temperature cross-section of the pressure tube showing hydrides as black indications following mechanically-assisted hydrogen-addition.

The pressure tube was sectioned for metallography examination and hydrogen analysis. Based on the exothermic DSC heat-flow profile, the temperature at the onset of precipitation was 325° C., which demonstrates that the micro pressure tube did not reach TSS. The corresponding TSS hydrogen concentration inferred from the DSC TSSD profiles was 146 ppm. Metallographic examination showed hydrides evenly distributed through the thickness of the micro pressure tube wall, shown in FIG. 9.

For the copper plug design, the forces were inferred from an estimate of hoop stress generated by thermal expansion of the plug after it was deformed into the micro pressure tube. The deformation process of the copper plug was not well characterized, so the pressure was not accurately known. The pressure of the hydrogen gas at 350° C. was estimated to be 250 MPa using Equation 8. Enough zirconium hydride was added to the test assembly to achieve 215 ppm in the micro pressure tube if the pressure was 140 MPa.

Possible reasons for why the hydrogen concentration was lower than expected include: hydrogen leaking from the test assembly; higher pressure being generated by the copper cylinder resulting in higher solubility of hydrogen in the copper; and lower pressures limiting the amount of hydrogen that can be dissolved into the zirconium. Significant leakage of hydrogen from the test assembly is unlikely because of the copper-to-zirconium metal bond formed when the assembly was loaded. Under a 16,300 kg load on the test assembly, the copper plug deformed into the micro pressure tube and extruded to cover both ends forming a strong copper-to-zirconium bond that required machining to separate at the end of the test.

It is unlikely that the pressure generated by the copper plug exceeded the calculated value, which would result in more hydrogen going into the copper and therefore less into the zirconium. If the pressure was double the calculated value, the solubility of hydrogen in copper would increase from 0.81 ppm to 1.15 ppm, which would only account for a 0.43 ppm reduction in hydrogen concentration in the zirconium.

The most likely reason for the hydrogen concentration being lower than expected is that the hydrogen gas pressure was lower than calculated. The assumptions that led to the calculated pressure were: the zirconium micro pressure tube was a rigid body; and the copper plug only deformed radially when heated. If the zirconium pressure tube was not rigid, or if the plug deformed axially, the pressures would be lower than calculated.

The rapidity of mechanically-assisted gaseous-hydrogen addition is a result of high-pressures permeation. Previous gaseous hydrogen addition techniques use low pressures ($\approx$100 kPa to a few hundred kPa) because hydride blisters were found to form at higher pressures; once blisters form the process becomes diffusion limited and hydrogen addition is slow like in electrolytic hydriding. It is believed that these blisters may have dissuaded practitioners from investigating the use of higher pressures. The inventors have discovered that when very high pressures (10 MPa to a few hundred MPa) are used blisters do not form, presumably because the permeation rate is faster than the rate of stable hydride formation.

A description of the underlying science for the mechanically-assisted gaseous-hydrogen addition process can provide useful practical insights into the mechanism. However, teachings of the present disclosure can be practiced regardless of the veracity of the proposed explanation of the mechanism.

For hydrogen addition below $C_-$, hydrogen gas is continuously produced by the decomposing zirconium hydride until it is all but depleted. At this point the volume of hydrogen decreases as the copper deforms under the applied load. Eventually the gas volume goes to zero, and the movement of hydrogen in the shell, and the zirconium no longer depends on permeability (i.e., there is no gas pressure). The movement of hydrogen in the metals is now diffusion limited. The implication is that when the gas volume goes to zero the rate of change of hydrogen concentrations in the metals will be reduced because the diffusivity rate is much lower than the permeability rate at high pressure. In the current method, the gas volume goes to zero, which distinguishes it from standard gaseous hydrogen addition where equilibrium is established between hydrogen in the metal and the gas phase which is at constant volume.

For hydrogen addition above $C_-$, and temperatures above about 180° C., the zirconium hydride powder ($ZrH_2$) decomposes forming hydrogen gas and a zirconium hydride powder with reduced stoichiometry called delta hydride, $ZrH_x$, where x is less than 2 but greater than 1. Gamma hydrides (ZrH) are the first hydrides to form in the metal. The mechanically-assisted gaseous-hydrogen addition process is limited and stops when the entire periphery of the delta hydride powder becomes gamma hydride, at which point Gibbs' Phase Rule is satisfied and equilibrium occurs. For temperature below ~180° C., delta hydrides are not included in the description of the mechanism. In this case, the process is limited and stops when the entire periphery of the $ZrH_2$ hydride becomes gamma hydride. It will be appreciated that a different metal hydride (e.g., $LiAlH_4$), and/or other compound that decomposes to hydrogen gas (e.g., $N_2H_4$), may not be subject to the limitations described above and could be used instead of zirconium hydride, $ZrH_2$, and can permit hydrogen addition below 180° C.

The mechanically-assisted gaseous-hydrogen addition technique can eliminate the disadvantages of traditional gaseous hydriding. For example, by reducing the amount of hydrogen to only what is required to reach the desired concentrations in the sample, and by using a hydride powder to produce the hydrogen gas, the explosion risk can be eliminated or substantially reduced. The process can also eliminate the requirement for large pressure vessels if large components are to be hydrided, by generating the pressure mechanically.

The mechanically-assisted gaseous-hydrogen addition technique can maintain the advantages of traditional gaseous hydrogen addition techniques, including: the capability to hydride using any combination of protium, and deuterium; and it can be a dry process unlike electrolytic hydriding. In addition, the mechanically-assisted technique may not be constrained by the TSS equilibrium between concentration and temperature. In the techniques of the present disclosure, the final hydrogen concentration can be determined by the mass of zirconium hydride added, and the temperature can be chosen independently.

The copper plug mechanically-assisted gaseous-hydrogen addition technique does not require any precise machining to match the internal profile of the pressure tube, so any ovality present in the ex-service pressure tubes can be accommodated. The technique used to add zirconium hydride to the assembly by spreading the powder by hand and carefully wrapping the copper mesh around the copper plug was performed successfully. This technique requires dexterity that may not be possible in the confines of a hot cell while using manipulators. Instead, hydride powder could be added by cold spraying of the copper plug. Cold spraying can be performed outside of the hot cell and is not limited to the geometry of the piece. A copper plug was successfully cold sprayed with zirconium hydride.

Adapting the current copper plug to add hydrogen to a full-size pressure tube could prove to be impractical. The mechanically-assisted technique could be modified for full size applications by using a thin copper tube cold sprayed with zirconium hydride that is expanded into the internal diameter of a pressure tube using a method similar to the production of a rolled joint. A plug of a material stronger than copper, and with a coefficient of thermal expansion greater than zirconium, could be machined to fit within the copper tube, which would have a consistent and precisely known inner diameter after the rolling process. An internal plug tube can also be pumped up to form a seal with a hydraulic fluid inside it (or water), not just with the apparatus used to make a rolled joint.

In conclusion, a mechanically-assisted technique was demonstrated to add hydrogen to zirconium alloys that incorporates gaseous hydrogen formation from zirconium hydride powder decomposition under isothermal and isobaric conditions. Quantitative hydrogen addition has been demonstrated, with added hydrogen to concentrations above the solubility limit and matching predicted values determined using mass balance, to 3% precision and 99% accuracy, which is within the error of the measurement techniques. The hydrogen in this technique can be confirmed to be a gas as it partitioned into the copper according to Sievert's law with a square-root pressure dependency. Hydrogen was added to flat sheets of Zircaloy-2 beyond standard solubility limits to concentrations that included 100 ppm at 200° C. in 22 h, and over 200 ppm at 280° C. in 20 hours, which are suitable concentrations and times at temperature so that irradiation damage is conserved. End-of-life hydrogen concentrations of ~150 ppm were reached in pressure tubes without exceeding 350° C. Hydrogen was added to a Zr-2.5Nb micro pressure tube fabricated to CANDU specifications to raise the concentration from as-received values to 146 ppm at 350° C. in seven days. Hydrides were seen to be uniformly distributed throughout the pressure tube cross-section.

Although the present disclosure describes two particular approaches for providing a shell assembly, namely, flat copper plates and a copper plug design, it should be appreciated that other structures and arrangements are possible for covering a metal alloy article and a metal hydride with a shell metal, to achieve mechanically-assisted gaseous-hydrogen addition.

Furthermore, it should be appreciated that, although the present disclosure focuses on the use of zirconium metal alloys and zirconium metal hydrides, the techniques described herein may work for all hydride-forming metals, namely, titanium, hafnium, vanadium, tantalum and niobium.

Tables 1, 2 and 3 below provide test data for the mechanically-assisted gaseous-hydrogen addition techniques. Examples of tests demonstrate a mechanically-assisted addition of hydrogen to a concentration of more than 200 ppm at 280° C. in 20 hours, and 100 ppm at 200° C. in 22 hours.

While the above description provides examples of one or more apparatuses or methods, it will be appreciated that other apparatuses or methods may be within the scope of the accompanying claims.

TABLE 1

| | Experimental Conditions | | | | | | Sample | | | |
|---|---|---|---|---|---|---|---|---|---|---|
| Identifier | Stress (MPa) | Applied Load (kN) | (±kN) | Sample Temperature (° C.) | (±° C.) | Duration (hrs) | Cu mass (g) | Cu area (m^2) | Zr mass (g) | Zr area (m^2) |
| 01-23-18 | 280.2 | 142.799 | 0.033 | 204.2 | 4.6 | 22.3 | 1.8164 | 1.28E-04 | 0.3842 | 7.28E-05 |
| | 279.6 | 142.799 | 0.033 | 204.2 | 4.6 | 22.3 | 1.7974 | 1.27E-04 | 0.3886 | 7.29E-05 |
| | 278.6 | 142.799 | 0.033 | 204.2 | 4.6 | 22.3 | 1.8131 | 1.28E-04 | 0.3904 | 7.32E-05 |
| | 272.1 | 142.799 | 0.033 | 204.2 | 4.6 | 22.3 | 1.7990 | 1.26E-04 | 0.3949 | 7.50E-05 |
| 01-10-18 | 266.8 | 81.600 | 0.019 | 201.5 | 4.0 | 22.3 | 1.8239 | 1.28E-04 | 0.4054 | 7.65E-05 |
| | 266.9 | 81.600 | 0.019 | 201.5 | 4.0 | 22.3 | 1.8266 | 1.28E-04 | 0.4049 | 7.64E-05 |
| | 265.7 | 81.600 | 0.019 | 201.5 | 4.0 | 22.3 | 1.8116 | 1.27E-04 | 0.4023 | 7.68E-05 |
| | 278.8 | 81.600 | 0.019 | 201.5 | 4.0 | 22.3 | 1.8248 | 1.28E-04 | 0.3908 | 7.32E-05 |

TABLE 1-continued

| | | | | | | | | | | |
|---|---|---|---|---|---|---|---|---|---|---|
| 08-21-17 | 141.3 | 40.801 | 0.010 | 249.9 | 3.5 | 18.3 | 3.2495 | 2.30E−04 | 0.3825 | 7.22E−05 |
| | 143.9 | 40.801 | 0.010 | 249.9 | 3.5 | 18.3 | 3.2166 | 2.30E−04 | 0.3821 | 7.09E−05 |
| | 142.3 | 40.801 | 0.010 | 249.9 | 3.5 | 18.3 | 3.2305 | 2.28E−04 | 0.3793 | 7.17E−05 |
| 12-19-17 | 129.3 | 40.794 | 0.054 | 253.1 | 3.8 | 19.9 | 1.0197 | 7.49E−05 | 0.4107 | 7.89E−05 |
| | 140.7 | 40.794 | 0.054 | 253.1 | 3.8 | 19.9 | 1.0104 | 7.21E−05 | 0.3882 | 7.25E−05 |
| 12-18-17 | 145.9 | 40.795 | 0.043 | 255.4 | 4.8 | 20.2 | 1.0130 | 7.43E−05 | 0.3784 | 6.99E−05 |
| | 138.8 | 40.795 | 0.043 | 255.4 | 4.8 | 20.2 | 1.8258 | 1.27E−04 | 0.3905 | 7.35E−05 |
| | 132.9 | 40.795 | 0.043 | 255.4 | 4.8 | 20.2 | 1.8289 | 1.28E−04 | 0.4089 | 7.67E−05 |
| | 139.6 | 40.795 | 0.043 | 255.4 | 4.8 | 20.2 | 1.0035 | 7.47E−05 | 0.3954 | 7.31E−05 |
| 08-30-17 | 141.4 | 40.826 | 0.011 | 275.9 | 0.2 | 20.0 | 1.8594 | 1.30E−04 | 0.3808 | 7.22E−05 |
| | 142.5 | 40.826 | 0.011 | 275.9 | 0.2 | 20.0 | 1.8480 | 1.30E−04 | 0.3866 | 7.16E−05 |
| | 140.4 | 40.826 | 0.011 | 275.9 | 0.2 | 20.0 | 1.7939 | 1.26E−04 | 0.3950 | 7.27E−05 |
| | 141.7 | 40.826 | 0.011 | 275.9 | 0.2 | 20.0 | 1.8039 | 1.27E−04 | 0.3914 | 7.20E−05 |
| 06-02-17 | 139.9 | 39.841 | 0.008 | 279.7 | 5.6 | 2.7 | 3.0906 | 2.16E−04 | 0.3879 | 7.12E−05 |
| 06-06-17 | 141.0 | 39.822 | 0.009 | 281.5 | 4.5 | 21.8 | 3.3222 | 2.32E−04 | 0.3858 | 7.06E−05 |

| | | Sample | | | | Reference | | |
|---|---|---|---|---|---|---|---|---|
| Identifier | ZrH2 mass (g) | DSC TSSd MS (3) (° C.) | DSC TSSp MS (3) (° C.) | Observed (ppm) | | DSC TSSp MS (3) | DSC TSSd MS (1) | Observed (ppm) |
| 01-23-18 | 0.0027 | 268.8 | 176.3 | 36.0 | | 124.0 | 216.3 | 15.4 |
| | 0.0036 | 268.9 | 177.3 | 36.1 | | 124.0 | 215.9 | 15.2 |
| | 0.0046 | 270.0 | 186.6 | 36.6 | | 124.8 | 216.0 | 15.3 |
| | 0.0055 | 291.3 | 210.8 | 49.5 | | 124.1 | 216.4 | 15.4 |
| 01-10-18 | 0.0067 | 311.3 | 234.0 | 64.4 | | 123.9 | 215.8 | 15.2 |
| | 0.0079 | 302.7 | 223.7 | 57.6 | | 123.3 | 215.9 | 15.2 |
| | 0.0097 | 329.6 | 254.7 | 80.7 | | 123.8 | 215.7 | 15.2 |
| | 0.0112 | 349.3 | 272.7 | 101.3 | | 125.2 | 214.8 | 14.9 |
| 08-21-17 | 0.0035 | 298.9 | 218.4 | 54.8 | | 122.9 | 215.0 | 15.0 |
| | 0.0066 | 310.4 | 230.4 | 63.7 | | 123.5 | 214.1 | 14.8 |
| | 0.0088 | 375.2 | 302.6 | 133.7 | | 123.7 | 213.8 | 14.7 |
| 12-19-17 | 0.0067 | 318.2 | 241.0 | 70.2 | | 124.1 | 214.1 | 14.8 |
| | 0.0071 | 327.6 | 250.8 | 78.7 | | | 215.3 | 15.1 |
| 12-18-17 | 0.0119 | 383.9 | 314.0 | 146.1 | | 121.7 | 214.9 | 15.0 |
| | 0.0068 | 347.6 | 273.1 | 99.4 | | 122.4 | 214.5 | 14.9 |
| | 0.0070 | 332.9 | 260.9 | 83.9 | | 123.6 | 215.4 | 15.1 |
| | 0.0124 | 354.1 | 282.2 | 106.8 | | 124.0 | 214.9 | 15.0 |
| 08-30-17 | 0.0066 | 358.4 | 283.8 | 111.9 | | 121.0 | 211.1 | 14.0 |
| | 0.0087 | 374.0 | 301.4 | 132.1 | | 120.4 | 211.3 | 14.0 |
| | 0.0074 | 345.3 | 270.7 | 96.8 | | 119.9 | 211.8 | 14.1 |
| | 0.0111 | 411.7 | 342.7 | 190.9 | | 120.2 | 210.9 | 13.9 |
| 06-02-17 | 0.0013 | 315.9 | 239.4 | 68.6 | | 144.5 | 232.1 | 20.2 |
| 06-06-17 | 0.0035 | 328.6 | 252.1 | 79.9 | | 127.4 | 218.3 | 15.9 |

TABLE 2

| | Experimental Conditions | | | | | | Sample | | | |
|---|---|---|---|---|---|---|---|---|---|---|
| Identifier | Stress (MPa) | Applied Load (kN) | (±kN) | Sample Temperature (° C.) | (±° C.) | Duration (hrs) | Cu mass (g) | Cu area (m^2) | Zr mass (g) | Zr area (m^2) |
| 08-29-17 | 141.7 | 40.843 | 0.013 | 282.0 | 5.3 | 20.1 | 1.8690 | 1.31E−04 | 0.3898 | 7.21E−05 |
| | 140.1 | 40.843 | 0.013 | 282.0 | 5.3 | 20.1 | 1.8517 | 1.30E−04 | 0.3879 | 7.29E−05 |
| | 140.2 | 40.843 | 0.013 | 282.0 | 5.3 | 20.1 | 1.8407 | 1.28E−04 | 0.3977 | 7.28E−05 |
| | 139.4 | 40.843 | 0.013 | 282.0 | 5.3 | 20.1 | 1.8513 | 1.30E−04 | 0.3971 | 7.33E−05 |
| 09-13-17 | 191.6 | 55.864 | 0.014 | 282.1 | 5.4 | 19.9 | 1.8347 | 1.27E−04 | 0.3929 | 7.29E−05 |
| | 191.5 | 55.864 | 0.014 | 282.1 | 5.4 | 19.9 | 1.8312 | 1.27E−04 | 0.3956 | 7.29E−05 |
| | 192.3 | 55.864 | 0.014 | 282.1 | 5.4 | 19.9 | 1.8293 | 1.28E−04 | 0.3891 | 7.26E−05 |
| | 192.8 | 55.864 | 0.014 | 282.1 | 5.4 | 19.9 | 1.8291 | 1.27E−04 | 0.3920 | 7.24E−05 |
| 06-12-17 | 324.3 | 91.650 | 0.012 | 283.0 | 6.5 | 2.7 | 3.2508 | 2.29E−04 | 0.3805 | 7.07E−05 |
| 06-01-17 | 120.0 | 34.891 | 0.009 | 299.4 | 4.0 | 16.8 | 3.1348 | 2.20E−04 | 0.3933 | 7.27E−05 |
| | 119.8 | 34.891 | 0.009 | 299.4 | 4.0 | 16.8 | 3.4375 | 2.40E−04 | 0.3908 | 7.28E−05 |
| | 120.2 | 34.891 | 0.009 | 299.4 | 4.0 | 16.8 | 3.4672 | 2.42E−04 | 0.3914 | 7.26E−05 |
| 10-06-16 | 118.6 | 17.324 | 0.011 | 350 | 0.3 | 142.9 | 5.9030 | 4.08E−04 | 0.4020 | 7.37E−05 |
| | 118.6 | 17.324 | 0.011 | 350 | 0.3 | 142.9 | 5.9006 | 4.05E−04 | 0.3935 | 7.23E−05 |
| 02-02-17 | 234.9 | 71.728 | 0.013 | 355 | 2.0 | 142.6 | 3.1530 | 2.21E−04 | 0.4113 | 7.60E−05 |
| | 234.9 | 71.728 | 0.013 | 355 | 2.0 | 142.6 | 3.1008 | 2.17E−04 | 0.4180 | 7.68E−05 |
| 02-15-17 | 61.4 | 18.762 | 0.008 | 350 | 1.1 | 19.2 | 3.1457 | 2.22E−04 | 0.4085 | 7.66E−05 |
| | 61.4 | 18.762 | 0.008 | 350 | 1.1 | 19.2 | 3.1794 | 2.24E−04 | 0.4075 | 7.64E−05 |
| | 61.4 | 18.762 | 0.008 | 350 | 1.1 | 19.2 | 3.1211 | 2.19E−04 | 0.4144 | 7.64E−05 |
| 05-31-17 | 140.0 | 41.012 | 0.010 | 348.3 | 3.9 | 19.8 | 3.4504 | 2.41E−04 | 0.3955 | 7.32E−05 |
| | 140.3 | 41.012 | 0.010 | 348.3 | 3.9 | 19.8 | 3.4455 | 2.39E−04 | 0.3944 | 7.31E−05 |
| | 139.8 | 41.012 | 0.010 | 348.3 | 3.9 | 19.8 | 3.4650 | 2.41E−04 | 0.3950 | 7.33E−05 |
| 09-05-17 | 64.6 | 18.836 | 0.012 | 349.7 | 4.5 | 139.7 | 1.8276 | 1.28E−04 | 0.3954 | 7.29E−05 |
| | 64.5 | 18.836 | 0.012 | 349.7 | 4.5 | 139.7 | 1.8454 | 1.29E−04 | 0.3917 | 7.30E−05 |

TABLE 2-continued

| | Sample | | | | Reference | | |
|---|---|---|---|---|---|---|---|
| Identifier | ZrH2 mass (g) | DSC TSSd MS (3) (° C.) | DSC TSSp MS (3) (° C.) | Observed (ppm) | DSC TSSp MS (3) | DSC TSSd MS (1) | Observed (ppm) |
| 08-29-17 | 0.0064 | 346.7 | 271.0 | 98.3 | 121.0 | 209.8 | 13.6 |
| | 0.0086 | 362.8 | 289.0 | 117.4 | 121.0 | 211.2 | 14.0 |
| | 0.0072 | 382.1 | 310.5 | 143.5 | 120.9 | 210.6 | 13.8 |
| | 0.0108 | 407.3 | 340.4 | 183.3 | 121.2 | 210.9 | 13.9 |
| 09-13-17 | 0.0042 | 329.6 | 254.0 | 80.7 | 122.0 | 213.2 | 14.5 |
| | 0.0085 | 381.1 | 310.9 | 142.1 | 121.8 | 213.9 | 14.7 |
| | 0.0102 | 383.0 | 312.4 | 144.8 | 122.2 | 213.8 | 14.7 |
| | 0.0130 | 418.1 | 351.6 | 202.5 | 121.9 | 212.7 | 14.4 |
| 06-12-17 | 0.0084 | 357.3 | 285.7 | 111.0 | 135.2 | 224.1 | 17.6 |
| 06-01-17 | 0.0012 | 308.2 | 232.0 | 62.3 | 146.5 | 223.5 | 17.5 |
| | 0.0064 | 394.0 | 324.8 | 162.0 | 135.1 | 221.7 | 16.9 |
| | 0.0080 | 395.8 | 327.9 | 164.9 | 132.6 | 222.3 | 17.1 |
| 10-06-16 | 0.0021 | 336.6 | 261.1 | 87.9 | 124.7 | 219.9 | 16.4 |
| | 0.0053 | 383.2 | 313.7 | 145.6 | 133.6 | 220.2 | 16.5 |
| 02-02-17 | 0.0031 | 375.1 | 305.9 | 134.0 | 126.4 | 214.9 | 15.0 |
| | 0.0039 | 382.2 | 311.2 | 144.1 | 127.6 | 215.2 | 15.1 |
| 02-15-17 | 0.0012 | 312.3 | 235.5 | 65.6 | 146.6 | 233.5 | 20.7 |
| | 0.0082 | 399.1 | 330.6 | 170.2 | 131.1 | 219.5 | 16.3 |
| | 0.0112 | 423.8 | 357.9 | 213.8 | | 220.0 | 16.4 |
| 05-31-17 | 0.0012 | 305.6 | 229.0 | 60.2 | 144.2 | 231.9 | 20.2 |
| | 0.0063 | 386.5 | 317.5 | 150.6 | 134.9 | 221.6 | 16.9 |
| | 0.0110 | 436.6 | 371.9 | 239.2 | 134.7 | 220.2 | 16.5 |
| 09-05-17 | 0.0104 | 433.9 | 364.9 | 232.9 | 121.6 | 213.3 | 14.5 |
| | 0.0121 | 449.4 | 380.4 | 265.6 | 119.5 | 212.5 | 14.3 |

TABLE 3

| | Experimental Conditions | | | | | | Sample | | | |
|---|---|---|---|---|---|---|---|---|---|---|
| Identifier | Stress (MPa) | Applied Load (kN) | (±kN) | Sample Temperature (° C.) | (±° C.) | Duration (hrs) | Cu mass (g) | Cu area (m^2) | Zr mass (g) | Zr area (m^2) |
| 04-12-17 | 119.5 | 34.802 | 0.011 | 351.8 | 3.5 | 140.2 | 3.2656 | 2.25E−04 | 0.3957 | 7.29E−05 |
| | 119.5 | 34.802 | 0.011 | 351.8 | 3.5 | 140.2 | 3.2736 | 2.26E−04 | 0.3929 | 7.22E−05 |
| | 119.5 | 34.802 | 0.011 | 351.8 | 3.5 | 140.2 | 3.2774 | 2.26E−04 | 0.3993 | 7.31E−05 |
| | 119.5 | 34.802 | 0.011 | 351.8 | 3.5 | 140.2 | 3.2800 | 2.26E−04 | 0.3911 | 7.29E−05 |
| 01-19-17 | 237.1 | 54.026 | 0.011 | 350 | 0.4 | 138.9 | 3.1412 | 2.18E−04 | 0.4142 | 7.59E−05 |
| 10-26-16 | 120.4 | 17.170 | 0.009 | 350 | 0.7 | 142.4 | 5.8338 | 4.07E−04 | 0.3807 | 7.25E−05 |
| | 120.4 | 17.170 | 0.009 | 350 | 0.7 | 142.4 | 5.8979 | 4.04E−04 | 0.3890 | 7.01E−05 |
| Sat-2T | 140 | | | 350 | | | 52.6382 | | 0.8917 | |
| Sat-2M | 140 | | | 350 | | | 61.4235 | | 1.0172 | |
| Sat-2B | 140 | | | 350 | | | 50.1986 | | 1.0170 | |
| Sat-3B | 140 | | | 350 | | | 58.8019 | | 1.7570 | |
| Sat-3M | 140 | | | 350 | | | 58.4621 | | 2.0575 | |
| Sat-3T | 140 | | | 350 | | | 57.2880 | | 1.6580 | |
| A20-175-00 | 120 | | | 425 | | | 39.6253 | | 3.5119 | |
| A20-100-00 | 120 | | | 425 | | | 56.1295 | | 3.7295 | |
| CU-100-1 | 120 | | | 425 | | | 152.6251 | | 3.4362 | |
| CU-50 | 120 | | | 425 | | | 48.6385 | | 3.7490 | |
| MH-DSC-1 | 99 | | | 425 | | | 56.3554 | | 3.1596 | |
| MH-DSC-2 | 99 | | | 425 | | | 49.8975 | | 3.2869 | |
| MH-DSC-3 | 99 | | | 425 | | | 59.8655 | | 3.2552 | |
| A16-200-00 | 120 | | | 450 | | | 65.2936 | | 3.5513 | |
| A20-250-00 | 120 | | | 450 | | | 68.8353 | | 3.6710 | |

| | Sample | | | | Reference | | |
|---|---|---|---|---|---|---|---|
| Identifier | ZrH2 mass (g) | DSC TSSd MS (3) (° C.) | DSC TSSp MS (3) (° C.) | Observed (ppm) | DSC TSSp MS (3) | DSC TSSd MS (1) | Observed (ppm) |
| 04-12-17 | 0.0011 | 318.6 | | 70.8 | 133.4 | 220.0 | 16.4 |
| | 0.0020 | 371.2 | 300.4 | 128.7 | 133.5 | 220.9 | 16.7 |
| | 0.0045 | 377.9 | 308.0 | 137.9 | 129.3 | 214.9 | 15.0 |
| | 0.0085 | 406.4 | 338.4 | 182.3 | 129.6 | 215.6 | 15.2 |
| 01-19-17 | 0.0018 | 338.8 | 264.6 | 90.3 | 134.0 | 219.0 | 16.1 |
| 10-26-16 | 0.0013 | 311.6 | 233.9 | 64.9 | 130.6 | 217.9 | 15.8 |
| | 0.0035 | 378.2 | 308.4 | 138.4 | 127.2 | 215.6 | 15.2 |
| Sat-2T | 0.0074 | 395.6 | 326.5 | 164.1 | | | |
| Sat-2M | 0.0072 | 361.9 | 291.0 | 116.3 | | | |
| Sat-2B | 0.0068 | 359.4 | 287.1 | 113.3 | | | |
| Sat-3B | 0.0154 | 408.3 | 342.1 | 185.1 | | | |

TABLE 3-continued

| | | | | |
|---|---|---|---|---|
| Sat-3M | 0.0216 | 434.2 | 372.7 | 233.8 |
| Sat-3T | 0.0129 | 371.3 | 298.5 | 128.5 |
| A20-175-00 | 0.0198 | 366.8 | | 122.6 |
| A20-100-00 | 0.0324 | 405.9 | | 181.1 |
| CU-100-1 | 0.0162 | 268.1 | 188.3 | 35.6 |
| CU-50 | 0.0082 | 268.4 | 189.3 | 35.8 |
| MH-DSC-1 | 0.0128 | 319.3 | 244.2 | 71.2 |
| MH-DSC-2 | 0.0138 | 329.7 | 254.1 | 80.7 |
| MH-DSC-3 | 0.0140 | 325.4 | 251.3 | 76.6 |
| A16-200-00 | 0.0331 | 403.7 | | 177.0 |
| A20-250-00 | 0.0432 | 435.5 | | 236.1 |

We claim:

1. A method of adding hydrogen to a metal alloy, comprising:
   providing an article formed of the metal alloy;
   providing a metal hydride;
   covering at least a portion of the article and the metal hydride with a shell metal to form an assembly;
   applying load to the assembly; and
   heating the assembly,
   wherein the shell metal deforms around the portion of the article and the metal hydride and forms a gas proof seal,
   wherein the metal hydride thermally decomposes to form hydrogen gas,
   wherein at least a portion of the hydrogen gas dissociates and moves as monoatomic hydrogen into the article, and
   wherein the article is in the form of a sheet, and the step of covering comprises arranging the article and the metal hydride between two plates of the shell metal.

2. The method of claim 1, wherein the metal hydride is in the form of a powder, and comprising dispersing the powder onto a surface of the article.

3. The method of claim 1, wherein, in the step of applying, the load is below a yield strength of the metal alloy and greater than a yield strength of the shell metal.

4. The method of claim 1, wherein, in the step of applying, the load applies a pressure that is maintained between about 10 MPa and 320 MPa.

5. The method of claim 1, wherein, in the step of heating, the temperature is maintained between about 20° C. and 500° C.

6. The method of claim 1, wherein, in the step of heating, the temperature is maintained between about 200° C. and 350° C.

7. The method of claim 1, comprising maintaining the assembly in isothermal and isobaric conditions between about 3 h and 7 days.

8. The method of claim 1, wherein the metal alloy is a zirconium alloy.

9. The method of claim 8, wherein the zirconium alloy is Zr-2.5Nb or Zircaloy-2.

10. The method of claim 1, wherein the metal hydride is a zirconium hydride.

11. The method of claim 10, wherein the zirconium hydride is $ZrH_2$.

12. The method of claim 1, wherein internal surfaces of the shell metal comprise a barrier oxide layer that fails and permits hydrogen ingress.

13. The method of claim 1, wherein external surfaces of the shell metal comprise an oxide layer that is a barrier to hydrogen egress.

14. The method of claim 1, wherein the shell metal is copper.

15. A method of adding hydrogen to a zirconium metal alloy, comprising:
   providing an article formed of the zirconium metal alloy;
   providing a powder formed of a zirconium metal hydride;
   enveloping the article and the powder with a shell metal to form an assembly, wherein the shell metal is copper;
   applying load to the assembly to apply a pressure that is maintained between about 10 MPa and 320 MPa; and
   heating the assembly to a temperature that is maintained between about 200° C. and 350° C.,
   wherein the shell metal deforms around the article and the powder and forms a gas proof seal,
   wherein the powder thermally decomposes to form hydrogen gas, and
   wherein at least a portion of the hydrogen gas dissociates and moves as monoatomic hydrogen into the article.

16. A method of adding hydrogen to a metal alloy, comprising:
   providing an article formed of the metal alloy;
   providing a metal hydride;
   covering at least a portion of the article and the metal hydride with a shell metal to form an assembly;
   applying load to the assembly; and
   heating the assembly,
   wherein the shell metal deforms around the portion of the article and the metal hydride and forms a gas proof seal,
   wherein the metal hydride thermally decomposes to form hydrogen gas,
   wherein at least a portion of the hydrogen gas dissociates and moves as monoatomic hydrogen into the article, and
   wherein, in the step of applying, the load is below a yield strength of the metal alloy and greater than a yield strength of the shell metal.

17. The method of claim 16, wherein, in the step of applying, the load applies a pressure that is maintained between about 10 MPa and 320 MPa.

18. The method of claim 16, wherein, in the step of heating, the temperature is maintained between about 200° C. and 350° C.

19. The method of claim 16, comprising maintaining the assembly in isothermal and isobaric conditions between about 3 h and 7 days.

20. The method of claim 16, wherein the metal alloy is a zirconium alloy, and the zirconium alloy is Zr-2.5Nb or Zircaloy-2.

* * * * *